H. H. WEST.
KNITTING MACHINE.
APPLICATION FILED JUNE 2, 1909.

993,807.

Patented May 30, 1911.
7 SHEETS—SHEET 1.

Witnesses
C. H. Giesbauer

Inventor
Harry H. West
by H. B. Willson &co
Attorneys

UNITED STATES PATENT OFFICE.

HARRY H. WEST, OF PLYMOUTH, PENNSYLVANIA, ASSIGNOR TO THOMAS WEST, OF PLYMOUTH, PENNSYLVANIA.

KNITTING-MACHINE.

993,807.   Specification of Letters Patent.   Patented May 30, 1911.

Original application filed December 21, 1908, Serial No. 468,578. Divided and this application filed June 2, 1909. Serial No. 499,679.

*To all whom it may concern:*

Be it known that I, HARRY H. WEST, a citizen of the United States, residing at Plymouth, in the county of Luzerne and State of Pennsylvania, have invented certain new and useful Improvements in Knitting-Machines; and I do declare the following to be a full, clear, and exact description of the invention, such as will enable others skilled in the art to which it appertains to make and use the same.

This invention relates to circular knitting machines adapted to knit complete seamless and striped stockings with heel and toe tips composed of a different yarn and in which all the operations are accomplished automatically and is a division of my application, Serial No. 468,578, filed December 21, 1908, patented March 29, 1910, No. 953,248.

The object of the invention is to provide simple and efficient means for operating the yarn changers by means of which the thread can be accurately changed to obtain any desired pattern.

With the foregoing and other objects in view, the invention consists of certain novel features of construction, combination and arrangement of parts, as will be more fully described and particularly pointed out in the appended claims.

In the accompanying drawings, Fig. 39 is a detail side elevation with parts broken out, of the pattern wheel operating pinion and the guard actuating mechanism mounted on the shaft on which said pinion is fixed.

Figure 29:
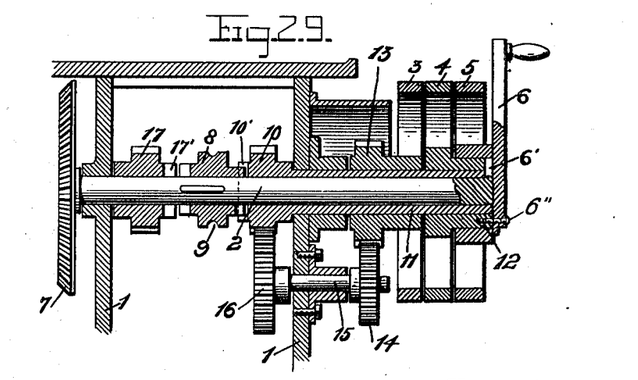
Fig. 29 is a detail longitudinal sectional view of the main driving shaft and the parts carried thereby.

In the embodiment illustrated, 1 denotes the frame of a knitting machine which may be of any desired construction, but is preferably of the type used with the machine known on the market as the Banner, and shown in patents to Hemphill, No. 933,433, dated September 7, 1909, and No. 934,969, dated September 21, 1909. Journaled in this frame is a main drive shaft 2, carrying what will be termed fast, slow and loose pulleys 3, 4 and 5, respectively, for a purpose to be hereinafter described, and on which the belt is adapted to be shifted automatically to vary the speed of the machine for the knitting of the different parts of the hose, for instance, it is desirable that the machine operate rapidly when forming the tubular leg and foot of the stocking and slow when reciprocating to form the heel and toe and when passing from the leg to the heel and from the foot to the toe. A handle 6 is fixed on a sleeve on the outer end of this shaft 2, and a bevel gear 7 is mounted on its inner end and adapted to mesh with a similar gear 7′ connected to operate the needle cylinder, (see Figs. 1 and 29). A clutch member 8 is keyed to slide on the shaft 2 and is provided with a groove 9 in its periphery for engagement by an operating or shifting member hereinafter described. This clutch is adapted to be moved either to the right or to the left to cause it to engage certain gears when certain parts to be described are operating. A gear 10 is mounted on the shaft 2 and has a sleeve 11 at its outer end extending to the outer end of said shaft 2 and on which the fast pulley 3 is revolubly mounted. The hub of this gear 10 also has a clutch member 10′ on its inner face for engagement with the sliding clutch 8 for a purpose to be described. The slow pulley 4 is mounted on the sleeve 11 and has a sleeve 12 extending to the end of the shaft 2 on which the loose pulley 5 rotates. The sleeves 11 and 12 of the gear 10 and pulley 4 are fixed together by means of a key 6″ formed integral with the handle 6, which is secured to the sleeve 11 of gear 10 by pins 6. A gear 13 is made integral with the fast pulley 3 and is adapted to mesh with a pinion 14 carried by a stub shaft 15 mounted in suitable bearings in the frame 1 and having a larger gear 16 at its other end which meshes with the gear 10 on the shaft 2. A gear 17 is loosely mounted on the shaft 2 and is provided on its inner face with a clutch member 17′ for engagement by the clutch 8 and is designed for a purpose hereinafter described.

A driving belt 18 is designed to operate on any one of the pulleys above referred to and a belt shifter 19 is connected to the frame and adapted to operate automatically to shift the belt onto the desired pulley. The free end of this shifter 19 extends into the path of an operating cam disk 20 which is shown in detail in Fig. 33 and which will be hereinafter further described. This belt shifting member 19 (see Fig. 1) has lateral outwardly extending pins 19ª which normally engage the belt 18 and when the shifter member 19 is moved outward or inward the desired distance by the cam disk 20, it carries the belt with it and shifts it to the desired pulley. This member 19 also has a lateral inwardly extending arm 19ᵇ provided with a lug 19ᶜ designed to engage the frame 1 to limit the outward swing of the shifter member 19. This arm 19ᵇ is also provided in its upper face with a notch or recess 19ᵈ adapted to be engaged by a pawl 19ᵉ for locking the shifter in position to hold the belt on the loose pulley 5. An arm 19ᶠ extends inwardly from the member 19 through suitable bearings of the frame 1 and has a collar 19ᵍ fixed thereto between which and the frame on said arm is a coiled spring 19ʰ designed to hold the free end of the member 19 yieldably in engagement with the operating cam disk 20. This belt shifter cam disk 20 which is fixed to one end of a shaft 90 and is shown in detail in Fig. 33 is provided on one face thereof with laterally extending cams 20ª, 20ᶜ and 20ᵉ with spaces 20ᵇ, 20ᵈ and 20ᶠ formed between them and the free lower end 19′ of the belt shifter lever 19 extends into the path of this cam disk and is operated by said cams to move the lever and shift the belt in the manner now to be described.

Figures 31, 32, 33, 34, 35, 37:
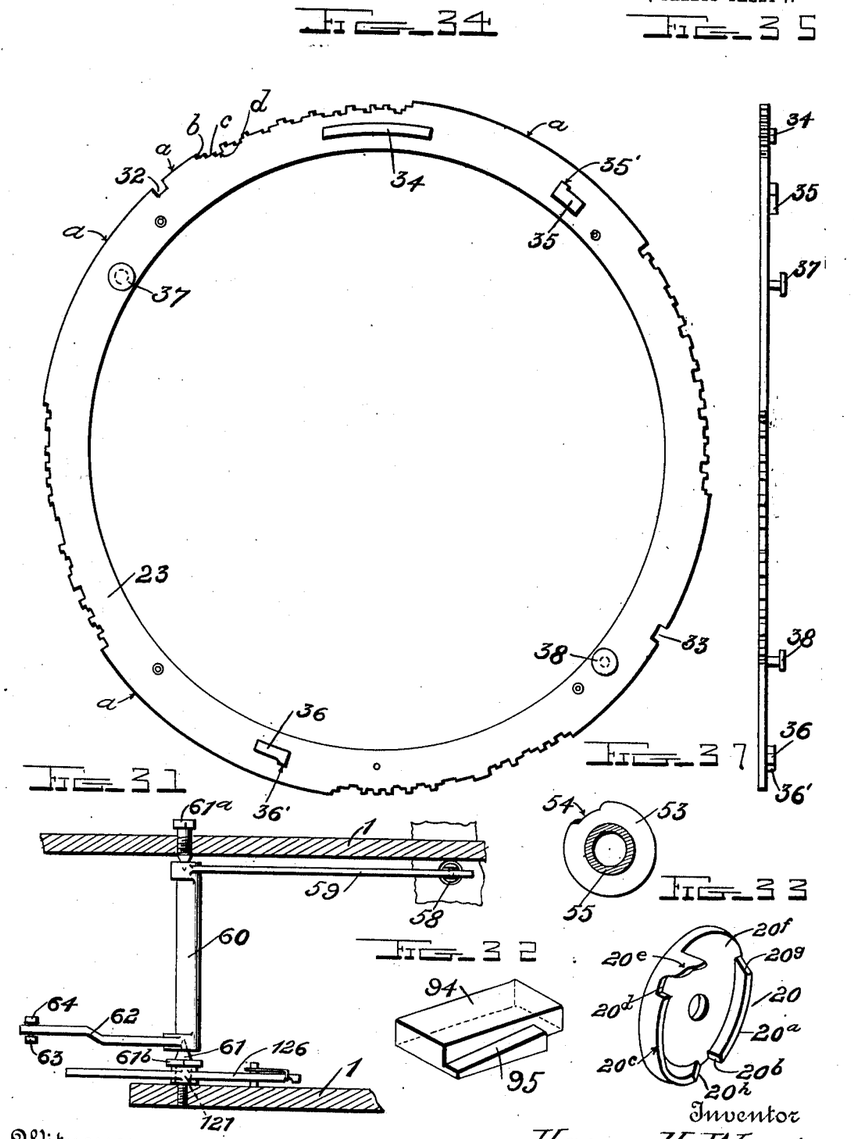
Fig. 31 is a detail horizontal sectional view through a portion of the housing disclosing the mechanism acted upon by the cams on the operating wheels.
Fig. 32 is a detail perspective view of the block employed in connection with one of the feeding pawls.
Fig. 33 is a detail perspective view of the belt shifting cam disk.
Fig. 34 is a detail side elevation of the pattern ring on an enlarged scale.
Fig. 35 is an edge view thereof.
Fig. 37 is a detail sectional view showing the guard disk in side elevation.

When the machine is operating to knit the leg of a stocking, the belt 18 is in position on the fast pulley 3 and the end 19′ of the shifter lever 19 engages the flat face of the disk 20 in the space 20ᶠ between cams 20ᵉ and 20ª (see Fig. 33). When the leg has been completed and the parts to be described have been actuated to throw the machine on the heel, the cam disk 20 is turned with the shaft 90 to cause the end 19′ to ride up the incline 20ᵍ of the cam 20ª into contact with its outer face or edge whereby the shifter member 19 is moved outwardly carrying the belt with it and shifting it onto the slow pulley 4 in which position it remains during the knitting of the heel. When the machine passes from the heel to the foot the disk 20 is turned sufficiently to cause the lever end 19′ to drop off the cam 20ª into the space 20ᵇ which moves the shifter 19 inwardly a sufficient distance to shift the belt onto the fast pulley 3 again where it remains during the knitting of the foot. The machine is then thrown onto the toe and the end 19′ moves up the incline 20ʰ of the cam 20ᶜ into engagement with the face of said cam thereby moving the shifter 19 outward again and transferring the belt to the slow pulley 4 where it remains until the toe is completed when the further turning of the disk 20 causes the end 19′ to drop off cam 20ᶜ into the recess 20ᵈ to again shift the belt to the fast pulley 3 to form the several waste courses known in the art as the "loopers rounds." When these courses are finished, the further turning of the disk causes the lever end 19' to move up the long cam face 20ᵉ which moves the lever 19 outward to its extreme limit and shifts the belt onto the loose pulley 5 and the machine is thrown out of operation.

Figure 30:
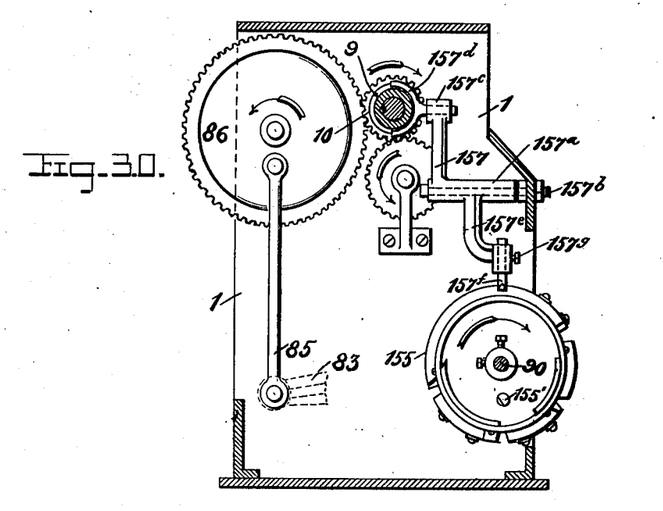
Fig. 30 is a vertical section through the machine taken in front of the cam drum.

A clutch operating lever 157 constructed as shown in Fig. 30 comprises a tubular member or sleeve 157ᵃ mounted to oscillate on a rod or shaft 157ᵇ suitably supported in the housing or frame 1. An upwardly extending arm 157ᶜ has a forked member 157ᵈ arranged in the free end thereof and said member projects into the groove 9 of the clutch member 8 and operates to shift said clutch 8 to the right or left on the rocking or oscillating of the member 157. This sleeve 157ᵃ also has an arm 157ᵉ extending downwardly therefrom and which is preferably curved toward the front and is provided with an upright pin 157ᶠ adjustably secured therein by a set screw 157ᵍ. The lower end of this pin or tooth is beveled and is adapted to extend into the path of a cam disk 155 hereinafter described and be operated thereby to rock or oscillate the member 157ᵃ and shift the clutch 8.

A depending bracket 21 (see Fig. 1) is mounted on the base plate 2' of the frame 1 and is similar in construction to that shown in my Patent No. 952,774, dated March 22, 1910. A large gear wheel 22 is journaled in said bracket 21 and carries a pattern ring 23, which latter ring will be hereinafter described in detail. The pattern ring 23 (see Fig. 34) is removably mounted on one side of the gear 22 preferably by means of screws and this ring is preferably provided with an aperture adapted to engage a pin mounted on the wheel 22. It will thus be evident that the pattern ring may be readily removed from the gear wheel 22 and a ring bearing a different pattern substituted therefor when desired. This pattern which is here shown in the form of an annulus (see Fig. 34) is provided on its periphery with a plurality of notches or recesses of different lengths and depths which are adapted to control the ordinary yarn changing controllers, the detailed operation of which is described in my Patent No. 953,248, dated March 29, 1910. The pattern ring 23 is also provided in its periphery with spaced notches 32 and 33 designed to receive the pin 24 at predetermined intervals to throw into operation certain yarn changers to provide for the formation of the tip of the toe and heel in a different colored yarn. This pattern ring 23 is also provided on one face thereof with a long arc-shaped cam 34 and with cams 36 and 35 arranged at proper distances on said ring to throw into operation certain mechanism hereinafter described. These cams 35 and 36 are provided on their upper faces near one end with raised portions or lugs 35' and 36' for a purpose to be described. Two removable headed studs or screws 37 and 38 are also arranged on the cam ring and are adapted to operate certain mechanism hereinafter described for forming extra courses such as are used in making full length hose. The heads of these studs extend in a plane beyond the cams on the ring to permit the member which is operated by the cams to ride thereunder without being actuated thereby.

Figure 36:
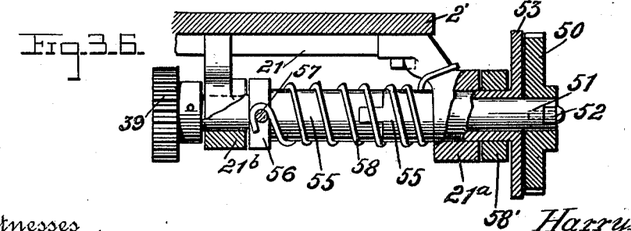
Fig. 36 is a detail side elevation, partly in section, of the pattern ring operating mechanism.

A shaft 51 is mounted in a bracket 21ᵃ bolted to the lower face of the base plate 2' and in an apertured ear 21ᵇ extending laterally from the bracket 21 (see Fig. 36). A pinion 39 is fixed to the shaft 51 at one end thereof and is arranged to mesh with and drive the gear 22 which carries the pattern ring 23. A ratchet wheel 50 is removably secured to the other end of the shaft 51 preferably by a key 52 to provide for its ready removal and the substitution of another wheel having a different number of teeth when it is desired to change the size of the stocking to be knit. A guard 53 made in the form of a disk having a recess 54 in its periphery (see Fig. 37) is made integral with one end of a sleeve 55 which encircles the shaft 51 and said guard is arranged adjacent the inner face of the ratchet 50 the periphery of said disk extending slightly beyond the teeth of the ratchet wheel 50 and is designed to hold the ratchet actuating pawl out of engagement with the teeth of said ratchet wheel, at predetermined intervals as will be hereinafter described. This sleeve 55 is preferably made in two sections (see Fig. 36) having a clutch-like connection to provide for the ready assembling of the parts. A collar 56 is mounted on the sleeve 55 and has an arm 57 extending laterally therefrom (see Fig. 36). A spring 58 is coiled around the sleeve 55 between the bracket 21ᵃ and said collar, and has one end secured to said bracket and the other end engaged with said arm 57 and has a tendency to force said arm normally downward. An arm 58' (see Figs. 1, 2, and 36) has one end engaged with said sleeve 55 for a purpose to be described. Any suitable means may be employed for actuating the ratchet wheel 50. A pawl 41 is here shown fixed to the outer end of a stub shaft 41ᵃ which extends laterally from the lower end of a pitman 40 and the other end of the arm 58' is also engaged with said stub shaft between the pawl 41 and the pitman (see Fig. 2) and serves as a spacing element to position the pawl 4 properly relative to the ratchet wheel 50. This pawl 41 is yieldably held in engagement with the ratchet wheel 50 by a spring (not shown). The pitman 40 carries near its lower end a stud 40ᵇ and the upper end thereof is pivoted eccentrically to the gear wheel 7 on the driving shaft 2, the stud forming a pivot for a lever to be described.

Figures 1, 2, 3:
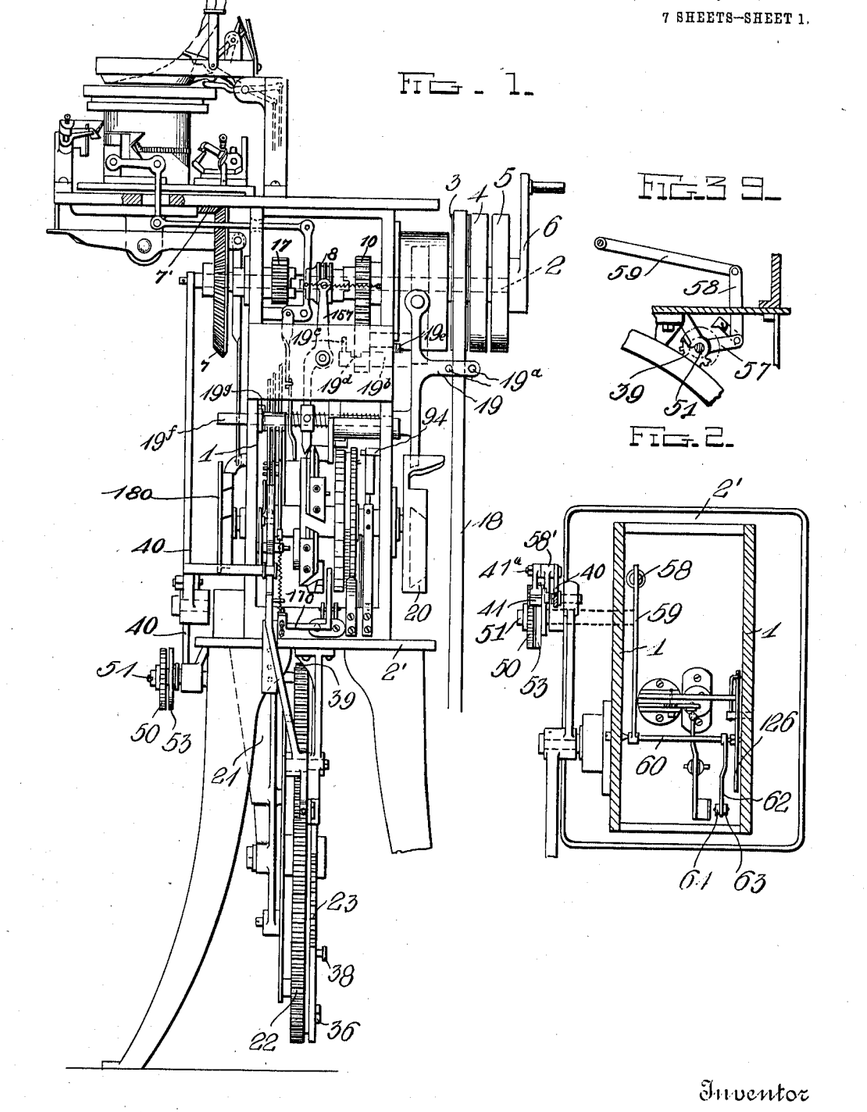
Figure 1 is a front elevation of a complete machine showing these improvements embodied therein.
Fig. 2 is a horizontal section disclosing the parts mounted on the base of the machine.
Fig. 3 is a plan view, with parts in section.
Figure 3:
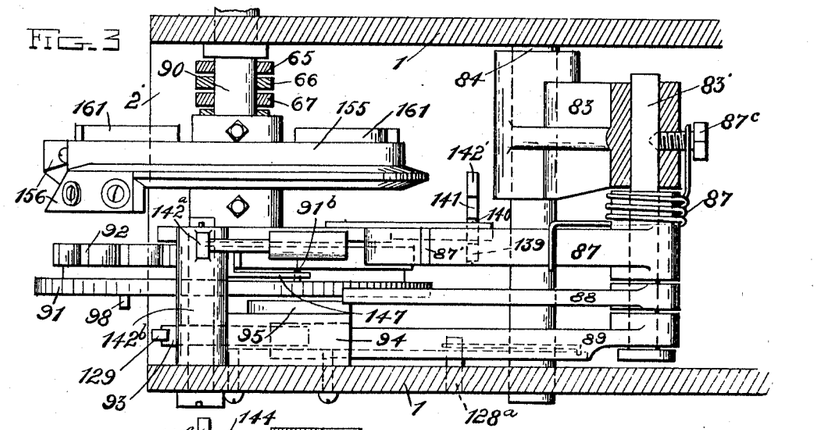

The recess 54 (see Fig. 37) formed in the periphery of the guard disk 53 permits the toe of the pawl 41 to normally drop therein in position to engage and operate the ratchet wheel 50 whereby the pattern ring is actuated. The head of the pawl 41 as shown clearly in Fig. 2 is made sufficiently wide to span the periphery of both the ratchet wheel 50 and guard disk 53 and operates said ratchet wheel only when the toe thereof rests in the recess 54. When it is desired to throw the pattern wheel out of operation, the unnotched portion of the periphery of the guard disk is caused to pass under the toe of the pawl 41 and raise it out of engagement with the teeth of the ratchet wheel 50, by means now to be described.

The guard 53 which elevates the toe of the pawl 41 is actuated by the following mechanism; to wit, the arm 57 which extends laterally from the sleeve 55 of the ratchet guard 53 has an upright arm 58 pivotally connected at its lower end with the outer end of said arm 57 and at its upper end with the free end of a horizontal bar 59 the other end of which is made integral with a shaft 60 journaled on suitable bearings 61 and 61ᵃ on the frame 1. (See Figs. 2, 36 and 39.) Another arm 62 made integral with the opposite end of the rock shaft 60 extends forwardly therefrom and is provided at its free end with two rollers 63 and 64 arranged on opposite sides thereof. These rollers are arranged in position to be engaged by certain cams hereinafter to be described whereby the arm 62 is depressed the shaft 60 rocked on its bearing and the motion is transmitted through the bar 59, arm 58, and arm 57 to turn the sleeve 55 of the guard 53 and turn said guard to cause its periphery to engage the toe of the pawl 41 and disengage it from the ratchet teeth of the wheel 50 and thereby throw the pattern ring out of operation.

The bearings 61 and 61ᵃ for the shaft 60 are preferably made in the form shown having pointed ends engaging sockets in the end of the shaft 60. The member 61ᵃ is preferably made in the form of a screw to adapt it to be adjusted to provide for wear of the parts. The member 61 is constructed in the form of a pointed stud having one end mounted in the housing and with a flange 61ᵇ arranged near its pointed end to provide a space between said flange and the housing to permit an extra course operating lever 126 to be pivotally mounted on said stud at this point.

A bell crank lever 83 is fulcrumed at 84 to the frame 1 and is rocked back and forth by means, not shown, for a purpose to be described.

Three pawls 87, 88 and 89 are pivotally mounted on a laterally extending stub shaft 83' carried by the upright arm of the bell crank lever 83 and these pawls are designed to operate under certain circumstances certain toothed wheels now to be described. The pawl 87 has an arm 87' extending upwardly therefrom which is designed to be engaged by a yieldable member hereinafter described. Three toothed wheels 91, 92 and 93 are mounted adjacent to each other on the shaft 90 which is journaled in the frame 1 and on which the clutch operating disk or drum 155, the belt shifting cam disk 20, the picker operating cam disk 180, and the levers 65, 66 and 67 are all mounted (see Figs. 1 and 3), two of said toothed wheels 91 and 93, and the three levers 65, 66 and 67 being revolubly mounted on said shaft and the other toothed wheel 92, the clutch operating cam disk 155, the belt shifter disk 20, and the picker operating disk 180 being fixed to the shaft by any suitable means and adapted to be turned with said shaft as will be hereinafter described.

A spring 87ᵇ is coiled around the hub of the pawl 87 and has one end attached to a screw 87ᶜ which extends through the lever 83 and fastens said stub shaft 83' firmly in place. The other end of this spring 87ᵇ bears on the upper face of the shank of the pawl 87 and holds it yieldably in operative position to insure a positive engagement of said pawl with the teeth of the wheel 92. The other pawls 88 and 89 operate by gravity as they are longer than pawl 87 and require no spring. The toe of pawl 87 is made sufficiently wide to provide for its spanning the periphery of wheel 92 and a lever 142 hereinafter described. When the pawl 87 swings forward the upright arm 87' thereof engages the cylinder 145 and swings the lever 142 on its fulcrum and lifts the free end of its long arm out of engagement with the head 138 of the lever 136 and permits said lever under the action of its spring 137 to swing back into position ready for the next operation.

The ratchet wheel 91 which is revoluble on the shaft 90 is provided on its periphery with the usual ratchet teeth of uniform size having one tooth 91' longer than the rest, and a block 94 secured to the casing or frame 1 has a laterally extending inclined portion 95 arranged adjacent the periphery of said ratchet wheel 91 and practically forms a continuation of the long tooth 91' and on which the pawl 88 is designed to reciprocate back and forth.

Figures 10, 11, 12:
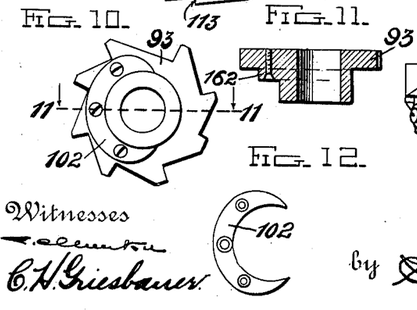
Fig. 10 is a detail side elevation of the ratchet wheel for throwing in additional courses.
Fig. 11 is a detail sectional view taken on line 11—11 of Fig. 10.
Fig. 12 is a side elevation of the cam shown in Fig. 10 detached.
Figure 14:
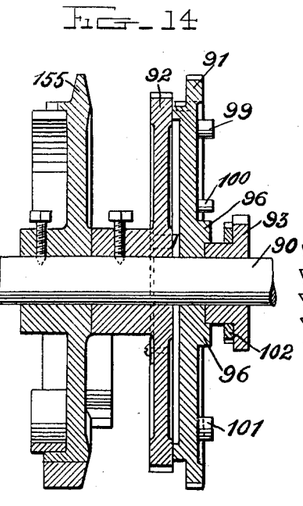
Fig. 14 is a vertical longitudinal sectional view taken through the operating wheels and the cam drum.
Figures 15, 16:
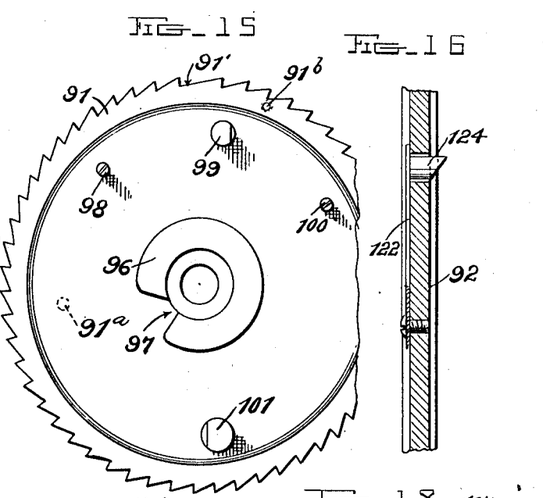
Fig. 15 is a side elevation of one of the operating wheels with parts broken out.
Fig. 16 is a detail sectional view taken on the line 16—16 of Fig. 9.

A cam 96 is fixed to the hub of the ratchet wheel 91 on its front or outer face and is preferably made in the form of a disk having a recess 97 formed in the periphery thereof and against the periphery of which the roller 64 is designed to bear as hereinbefore described. This ratchet wheel 91 is provided on its front or outer face with a plurality of laterally extending studs of varying sizes, four being herein shown and numbered 98, 99, 100 and 101, for a purpose to be described. A spring 130 is arranged to engage and hold said wheel 91 against backward movement. A comparatively small toothed wheel 93 is also revoluble on the shaft 90. The teeth of this wheel 93 are designed to be engaged by the pawl 89 when the extra courses are to be formed for making a longer foot or leg for a stocking as above referred to and as will be hereinafter described. A cam 102 (shown in Figs. 10 and 12) is secured to the hub of this wheel 93 adjacent its inner face and is adapted to be engaged by the roller 63 hereinbefore described. (See Figs. 2, 4 and 31.)

The pawl 89 is held normally out of engagement with the teeth of wheel 93 by means of a lever 126, the free end of which is arranged in the path of said pawl 89 to permit it to rock back and forth thereon without engaging the teeth of said wheel 93, until said lever 126 is depressed by a certain actuating mechanism to be described, when it is desired to have the pawl 89 operate the wheel 93 for knitting the extra courses. A small spring pressed pawl 129 is arranged to engage the teeth of the wheel 93 and hold it against backward movement.

Figures 5, 6, 8, 9, 13:
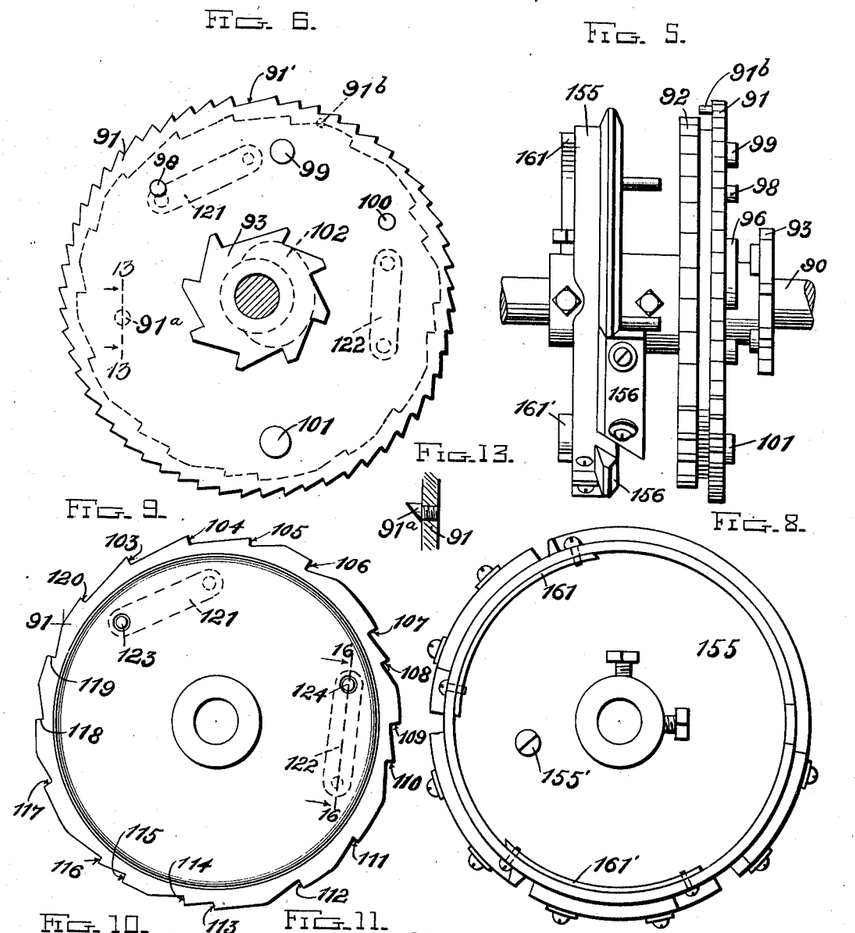
Fig. 5 is a side elevation of the operating wheels and the cam drum.
Fig. 6 is an end elevation looking in the direction of the arrow in Fig. 5.
Fig. 8 is a side elevation thereof.
Fig. 9 is a detail side elevation of one of the operating wheels detached.
Fig. 13 is a detail vertical sectional view on the line 13—13 of Fig. 10.
Figure 7:
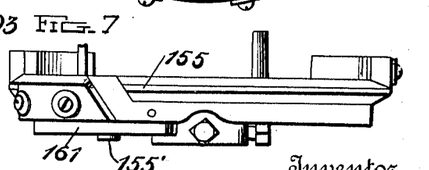
Fig. 7 is a detail edge view of the clutch operating cam drum.

The wheel 92 is provided on its periphery with a plurality of teeth of varying sizes, eighteen being here shown and which are designated as 103, 104, 105, 106, 107, 108, 109, 110, 111, 112, 113, 114, 115, 116, 117, 118, 119 and 120, (see Fig. 9), the purpose of which will be hereinafter described.

Mounted on one face of the ratchet wheel 92 are two flat springs 121 and 122 which are secured at one end to the wheel and have beveled teeth 123 and 124 at their free ends which extend through apertures in said wheel and the ends thereof project beyond the opposite face of the wheel and are designed to engage a stud 91$^a$ on the adjacent face of the wheel 91 for a purpose to be described.

Figures 22, 23, 24, 25, 26, 27, 28, 38:
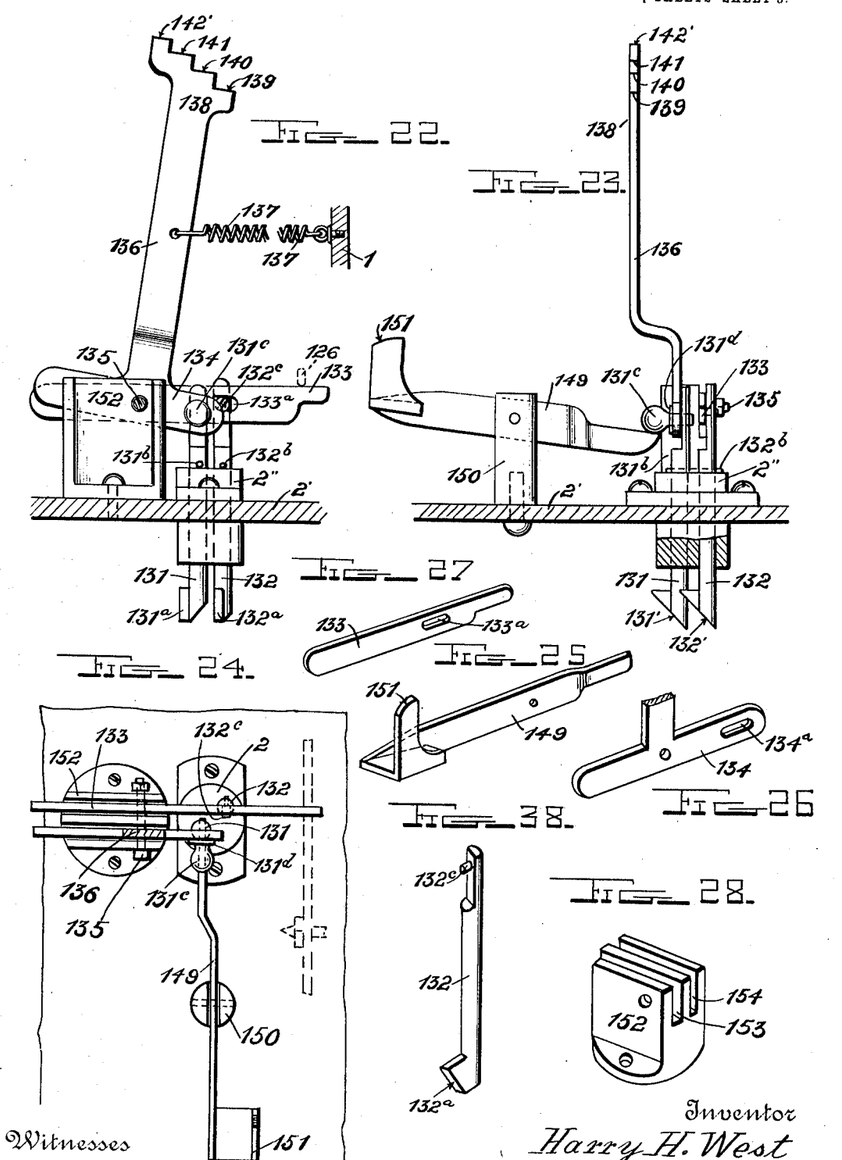
Fig. 22 is a sectional view through the base of the machine disclosing the parts operated upon by the cams and studs on the pattern ring.
Fig. 23 is a similar view taken at right angles to Fig. 22.
Fig. 24 is a plan view thereof.
Fig. 25 is a detail perspective view of the operating lever engaged by the studs on one of the operating wheels.
Fig. 26 is a detail perspective view of the lower end of the upright lever shown in Fig. 22.
Fig. 27 is a detail perspective view of the lever operated upon by the studs on the cam wheel.
Fig. 28 is a detail perspective view of the block in which the levers shown in Figs. 22 and 23 are mounted.
Fig. 38 is a detail perspective view of one of the pawl rods.

Two members 131 and 132 operated by the cams and headed studs on the pattern ring are mounted to move vertically through the base plate 2' and a guide block 2'' bolted to said base plate. These members which are similar in construction and are shown clearly in Figs. 22, 23 and 38 are made in the form of rods having lugs 131$^a$ and 132$^a$ extending laterally from the lower ends thereof with the lower faces of said lugs inclined downwardly forming dogs or pawls at the lower ends of said rods. The upper ends of the rods are cut away on one face to form flat lever engaging surfaces to prevent the turning of said rods relatively to the levers with which they are connected. The rods are provided near their cut out upper ends with laterally extending stops, preferably made in the form of pins 131$^b$ and 132$^b$ passed through said rods and designed to engage the upper face of the block 2'' for limiting the downward movement of said members.

Figures 17, 18, 19, 20, 21:
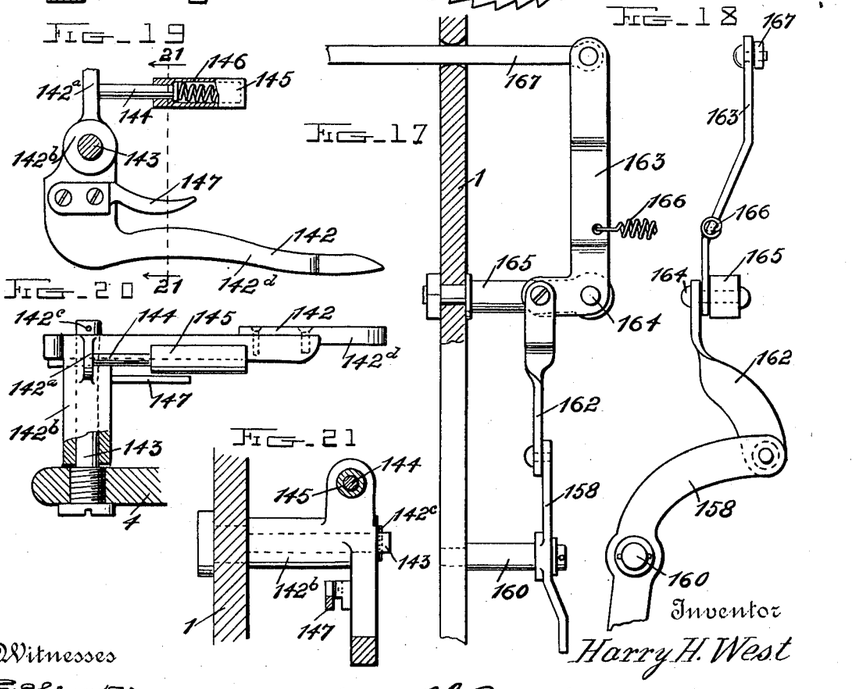
Figs. 17 and 18 are detail views of the mechanism employed for raising the cam guards.
Fig. 19 is a side elevation, partly in section, of the lever employed in connection with the feeding pawls.
Fig. 20 is a plan view thereof.
Fig. 21 is a detail vertical sectional view taken on line 21—21 of Fig. 19.

The cut out upper end of rod 131 is connected with one end of a bar or lever 134, fulcrumed at 135, by means of a headed stud 131$^c$ the stem or shank of which extends through a longitudinally extending slot 134$^a$ at one end of the lever 134 and through the upper end of the rod 131, the slot providing for the tilting of said lever as will be hereinafter described. This stud 131$^c$ has an annular flange 131$^d$ arranged adjacent the head thereof which bears against the outer face of the lever end. The head of the stud 131$^c$ projects into the path of one end of a vertically swinging lever 149 and by means of which the lever 134 is tilted as will be described. An upright bar 136 having an off-set formed therein extends upwardly at right angles from and is made integral with the lever 134 and together they form an inverted T-shaped member. This upright bar is yieldably connected with the housing by means of a coiled pull spring 137 and which holds it and the lever 134 in the tilted position shown in Fig. 22 and returns it to this position after it has been moved in the opposite direction by means to be described. The upper end of this upright bar 136 has a stepped head 138, three steps 139, 140 and 141 being shown, the top or outer end 142' forming another. These steps are adapted to be engaged by the free end of the long arm of a substantially L-shaped lever or pawl guard 142 (see Figs. 19 and 20). The upright short arm 142$^a$ of this lever has a laterally extending tubular member 142$^b$ which is pivotally mounted on a bolt or stub shaft 143 extending inwardly from the housing and a pin 142$^c$ holds said lever in position on said shaft. The free end of the short upright arm 142$^a$ is provided with a rod 144 extending laterally in the same direction as the horizontally disposed long arm 142$^d$. The free end of the rod 144 operates piston-like in a cylinder 145 having a cushioning spring 146 arranged in said cylinder between the free enlarged end of the rod 144 and the closed outer end of the cylinder, the cylinder being movable on the rod 144. This yielding cylinder is adapted to be engaged by the upright arm 87' of the pawl 87 and is made yieldable to prevent breakage of the parts when they come in contact. A finger 147 extends from the short arm of the lever 142 in position to engage a pin 91$^b$ on the ratchet wheel 91 to act as a safety guard for holding the lever 142 under the pawl 87 and prevent its engagement with the teeth of the wheel 92 until the proper mechanisms have been operated.

Figure 4:
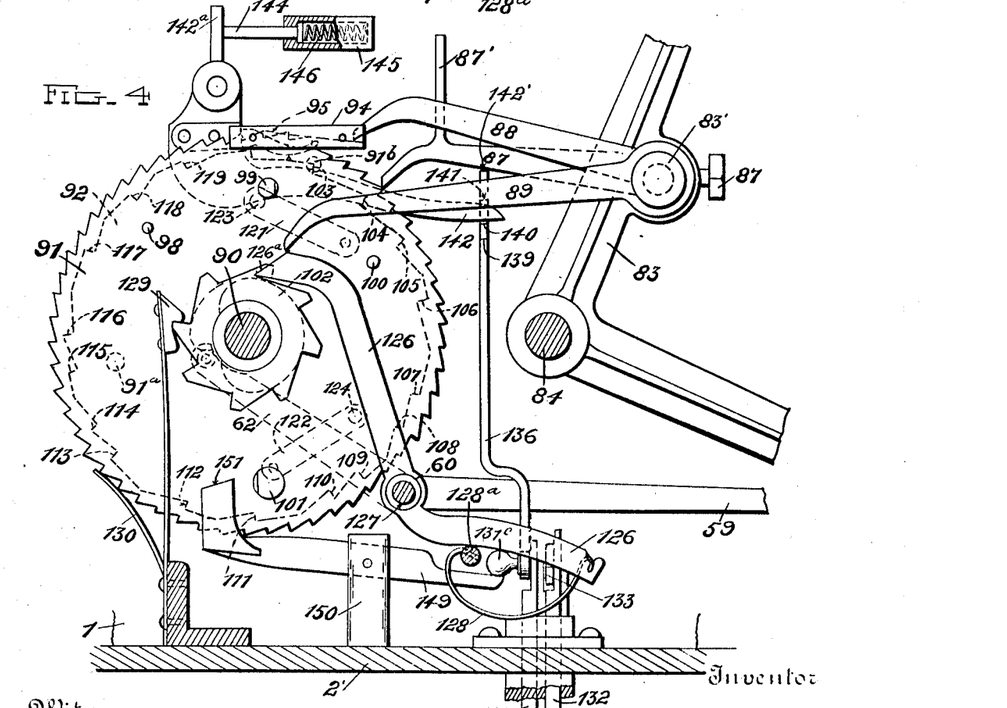
Fig. 4 is an enlarged detail vertical sectional view taken through the operating wheels and adjacent parts.

The horizontally disposed lever 149 hereinbefore referred to is pivoted intermediately of its ends to a post 150 projecting upwardly from the base plate 2', and one end thereof extends under the head of the stud 131ᶜ and an L-shaped lug 151 extends laterally from its other end with the free arm thereof extending upwardly and having its terminal inclined on its upper face as is clearly shown in Figs. 4 and 25. This inclined arm at the end of the lever 149 is arranged in the path of the studs carried by the ratchet wheel 91 and is adapted to be operated by said studs for tilting the lever 136 and is engaged by said studs on the rotation of the ratchet wheel 92 whereby the lever 142 is caused to drop a distance measured by the step on the lever 136 brought under it to permit the pawl 87 to engage the desired tooth on the ratchet wheel 92 as will be hereinafter more fully described.

The rod 132 has a lateral stud 132ᶜ on the flat face of its upper end which extends through an elongated slot 133ᵃ near one end of a lever 133 which end is arranged to engage the lever 126 to depress the free end thereof out of the path of the pawl 89 to permit said pawl to operate the wheel 93 for forming the extra courses and this rod 132 is actuated by the removable headed studs 37 and 38 carried by the pattern wheel and when the head of one of these studs is brought into the path of the pawl end of the rod 132, said rod is raised thereby lifting the end of the lever 133 which bears against the lower face of the lever 126 and thereby raising said end and depressing the other curved end thus removing it out of the path of the pawl 89 and permitting said pawl to engage the teeth of the wheel 93. The rotation of this wheel 93 brings the cam 102 thereof under the roller 63 on the lever 62 and depresses said roller carried end which operates through the shaft 60, arm 59, link 58' and arm 57, to turn the guard 53 under the pawl 41 and thus throw the pattern wheel out of operation. The pawl 89 continues to turn the wheel 93 and the extra courses are knit until the cam 102 has been turned sufficiently to permit the roller 63 to run off the other end thereof which operates through the lever 62 and the links and arms connected therewith to turn the guard from under the pawl 41 to again throw the pattern ring into operation. On the rotation of the pattern ring the stud moves out of engagement with the pawl 132 and it is forced down by the pressure of the lever 126 on the lever 133 under the tension of the spring 128 and which also elevates the curved end of said lever 126 into the path of the pawl 89 whereby the knitting of the extra courses is stopped.

The lever 126 is pivoted at 127 to the bearing or stud 61 and has a beveled pawl-like nose 126ᵃ at its upper free end which normally lies in the path of the pawl 89 and holds it out of engagement with the teeth of wheel 93 until said nose is depressed by the lever 133 forcing its other end upward, when the pawl 89 will drop into engagement with the teeth and turn the wheel 93. A curved spring 128 has one end secured at 128ᵃ to the side of the housing and the other end thereof is engaged with the free lower end of lever 126 and is designed to hold the beveled upper end of said lever normally in the path of pawl 89 and also to limit the downward movement of said lever. The levers 133 and 134 are preferably pivotally mounted in a block 152 which is fastened to the base plate 2' in any suitable manner and is provided in its upper end with spaced recesses or slots 153 and 154 in which said levers 134 and 133 are pivoted as is shown in Figs. 22, 24 and 28 by a bolt 135.

A cam disk or drum 155 is fixed to the shaft 90 and is provided with suitable laterally extending cams as 156 which are adapted to engage the pin 157ᵈ of the clutch operating lever 157 to rock said lever and shift the clutch 8 into engagement with the pinions 10 and 17, respectively, when desired, and which will be more fully brought out in the description of the operation of the machine, (see Figs. 1 and 30).

A needle actuating switch cam operating lever 158 is fulcrumed at 159 to a stub shaft 160 secured to the frame 1 and the free end of this lever projects into the path of the laterally extending cams as 161 and 161' carried by the drum or cam disk 155 which are designed to operate the switch cam for raising and lowering the needles during the formation of the heel and toe as will be hereinafter more fully described in the description of the operation of the machine. This lever 158 is constructed in the form shown in Figs. 17 and 18 and a link 162 is pivotally connected at one end with the lever 158 and at its other end to a bell crank lever 163 which is fulcrumed at 164 to a stub shaft 165 which extends laterally from the frame 1 and a spring 166 is connected at one end to the long upright arm of the lever 163 and at its other end to the frame 1 and is designed to hold the free end of the lever 158 in engagement with the cams of the cam disk 155. A link 167 is pivotally connected with the free end of the long upwardly extending arm of the lever 163 and at its other end with a bell crank lever 168 connected with the switch cam.

Secured to the shaft 90 at the opposite end thereof from the belt shifting cam disk 20 is a cam disk 180 by which the picker operating lever 181 is actuated (see Fig. 1), and which is connected to operate the pickers in a well known manner such as is shown in the Banner machine shown in the Hemphill Patent No. 933,433, dated September 7, 1909.

It is to be understood that during the formation of the leg and foot, the needle cylinder rotates and when forming the heel and toe it reciprocates one half of the needles only being in operation, during the knitting of the heel and toe.

In the operation of this machine, the parts of which are shown at their starting or initial position for beginning the knitting of the leg, see particularly Figs. 1, 2, 3 4 and 22, the driving belt 18 is operating on the fast pulley 3 (as shown in Fig. 1) and the clutch 8 is engaged with the clutch member 10' of the gear 10 to provide for the rapid rotation of the needle cylinder. The pawl rod 131 rests on the long arc-shaped cam 34 about midway thereof with the stud or pin 131$^a$ resting on the guide block, as shown in Figs. 3, 4 and 22, with the end of the pawl guard or lever 142 resting on or engaging the step 140 of the head 138 of the upright tilting lever 136 and the oscillating pawl 87 engages what are herein termed the idle teeth 103, 104 and 105 of wheel 92, said wheel during the actuation of these teeth being idle or in other words operating no mechanism. As the knitting of the leg proceeds the cam 34 on the pattern ring 23 moves from under the pawl rod 131 and said rod is held in this position by its pin 131$^a$ resting on the guide block, the lever 136 having been tilted to bring the extreme end or step 142' of the head 138 in engagement with the lever 142 bringing said lever 142 under said pawl 87 and thereby throwing the actuating wheel out of operation. As the pattern ring rotates, the various yarn changers are operated to produce the various predetermined stripes by the means and in the manner described in my Patent No. 953,248, dated March 29, 1910, and of which this application is a division. The cam 36 on ring 23 then passes under the pawl rod 131 and tilts lever 136 in position to bring its step 141 into engagement with the lever 142, thereby permitting the pawl 87 to engage the tooth 106 and turn the shaft 90 to bring the slowing-up mechanism into operation preparatory to the throwing of the needles onto the heel. The raised end or lug 36' of the cam 36 lifts the rod 131 higher and tilts the lever 136 backward to permit the lever 142 to drop onto the lowest step 139 and allows the pawl 87 to engage the tooth 107 which turns the shaft and actuates the mechanism to throw the machine on the heel the cam disk or drum 155 being turned sufficiently to shift the clutch 8 to the left into engagement with the clutch member of the gear 17 for the formation of the heel. At the same time the yielding pin 123 engages the stud 91$^a$ on the inner face of the ratchet wheel 91, whereby a jerking movement is imparted to said wheel 91 turning it sufficiently to permit the pawl 88 to engage the small teeth of said wheel 91 and actuate the wheel. Simultaneously the cam 96 on the hub of the wheel 91 is turned in position to engage the roller 64 on the end of the lever 62 and thereby turns the guard 53 to cause it to raise the toe of pawl 41 out of engagement with the ratchet wheel 50 which actuates the pattern ring and whereby the said pattern wheel remains stationary. The feeding of the cam disks and the toothed wheels is now accomplished by the ratchet wheel 91, it having been brought into position for engagement by the feeding pawl 88 as above described. The stud or screw 98 on the outer face of the ratchet wheel 91 is now brought into engagement with the upper inclined end of arm 151 of the lever 149 and depresses the opposite end thereof which extends under the laterally extending head 148 of the stud which connects the slotted end of the lever or bar 134 with the upper end of the pawl rod 131. This movement of the lever 149 tilts the upright lever 136 and permits the lever 142 to drop onto the step 141 of head 138 and permits the pawl 87 to engage the tooth 108 which turns the shaft 90 a sufficient distance to turn the cam disk 155 to bring the stud 155$^a$ thereof into engagement with the end 172 of the lever 170 for throwing the desired color in to form the heel tip. The stud 99 on the ratchet wheel 91 is now engaged with the arm 151 of lever 149 and tilts the upright 136 a sufficient distance to permit the lever 142 to drop onto the step 140 of the head 138 of the lever 136 and permits the pawl 87 to engage the tooth 109 and turns the shaft 90 and the widening picker operating cam disk 180 to operate the lever 181 to take down a portion of the needles, two needles being drawn down at a time on each reciprocation, thus forming the gore in the heel. The small stud 100 next engages the arm 151 of the lever 149 thereby tilting the lever 136 to permit the lever 142 to drop onto the step 141 and allow the pawl 87 to engage the tooth 110 which rotates the mechanism for completing the tip of the heel. As before stated, during the above described operations, the pattern ring is stationary. The large stud 101 now engages the arm 151 of the lever 149 thereby tilting the upright lever 136 into position to permit the lever 142 to drop onto the step 139 of the head 138 and allow the pawl 87 to engage the tooth 111 thus operating the mechanism to throw the machine off from the heel onto the foot, the clutch 8 being shifted from the left to the right to cause it to engage with the member 10' of the gear 10 to provide for the rapid operation of the needle cylinder during the formation of the foot, it being understood that the belt has been shifted from the slow pulley 4 onto the fast pulley 3 for the formation of the foot. At the same time, the ratchet wheel 91 and the cam 96 carried thereby have made one complete revolution and the roller 64 drops into the notch 97 thereof which, through the arm 62 and the levers connected therewith, turns the cam or guard disk 53 to bring the recess therein opposite the pawl 41 to permit said pawl to again engage the teeth of the ratchet wheel 50 thereby throwing the pattern ring 23 again into operation for the formation of the foot.

After the foot has been completed, the cam 35 comes in contact with the pawl-shaped end of the rod 131 thereby raising said rod and tilting the lever 136 to permit the lever or pawl 142 to drop onto the step 140 and allow the pawl 87 to engage the tooth 112 to operate the mechanism for slowing up the machine. The further movement of the pattern ring 23 causes the upwardly extending lug 35' thereof to further raise the rod 131 and tilt the lever 136 into position to permit the lever 142 to drop onto the step 139 thereby permitting the pawl 87 to engage the tooth 113 which operates the mechanism for throwing in the needles for knitting the toe, the clutch 8 having been simultaneously shifted from right to left to engage with the gear wheel 17 and the belt is also shifted onto the slow pulley 4 for operation during the formation of the toe. At the end of this stroke of the pawl 87, the yielding stud 92ª comes in contact with the stud 91ª on the ratchet wheel 91, thus allowing the pawl 88 to engage the first small tooth which follows the long tooth 91' of the ratchet wheel 91 and the cam 96 on the outer face of said ratchet wheel 91 again engages the roller 64 and through the levers and links connected therewith turns the guard 53 into the path of the pawl 41 and throws the pattern wheel again out of operation.

The same operations, as above described for making a heel are performed for making the toe.

The courses for forming the "loopers rounds" are knit during the turning of the pattern ring from cam 35 to cam 34. The pattern wheel is then rotated to bring the long cam 34 under the pawl-like end of the rod 131 which lifts said rod upward and through it tilts the upright 136 into position to permit the lever 142 to drop onto the step 140 of the head of said member 136 and to allow the pawl 87 to engage the tooth 118 for slowing up the machine. The rod 131 is held up by the long cam 34 so that the next forward movement of the feed pawl 87 engages the tooth 119 which turns the shaft 90 a sufficient distance to cause the free end 19' of the lever 19 to ride upward on the cam face of the disk 20 and shift the belt 18 onto the loose pulley 5 and while the belt is being shifted, sufficient time elapses, cam 34 still holding the rod 131 in raised position, to permit the feed pawl 87 to engage the tooth 120 which operates the mechanism for leveling the needles ready for the operator to transfer another rib top onto said needles and start another stocking.

When it is desired to knit a full length hose or one having an extra long foot the removable headed studs 37 and 38 are inserted at the desired position on the face of the pattern ring which carries the cams and when the head of one of these studs is brought into the path of the pawl end of the rod 132, said rod is raised thereby lifting the end of the lever 133 which bears against the lower face of the lever 126 and thereby raising said end and depressing the other curved end thus removing it out of the path of the pawl 89 and permitting said pawl to engage the teeth of the wheel 93. The rotation of this wheel 93 brings the cam 102 thereof under the roller 63 on the lever 62 and depresses said roller carried end which operates through the shaft 60, arm 59, link 58 and arm 57, to turn the guard 53 under the pawl 41 and thus throw the pattern wheel out of operation. The pawl 89 continues to turn the wheel 93 and the extra courses are knit until the cam 102 has been turned sufficiently to permit the roller 63 to run off the other end thereof which operates through the lever 62 and the links and arms connected therewith to turn the guard from under the pawl 41 to again throw the pattern ring into operation. On the rotation of the pattern ring the stud moves out of engagement with the pawl 132 and it is forced down by the pressure of the lever 126 on the lever 133 under the tension of the spring 128 and which also elevates the curved end of said lever 126 into the path of the pawl 89 whereby the knitting of the extra courses is stopped.

What I claim is:—

1. In a knitting machine, the combination of a supporting frame, a cam shaft rotatably mounted therein, a pattern ring mounted to revolve on said frame, a ratchet wheel mounted to revolve on said shaft, an irregularly toothed actuator wheel fixed to said shaft adjacent to the inner face of said ratchet wheel, and operable to turn said shaft, a bell crank lever fulcrumed to said frame, means for rocking said lever, a stub shaft carried by the upright arm of said lever, feeding pawls for said ratchet and irregularly toothed wheels pivotally mounted on said stub shaft with their toothed ends arranged in position to engage the teeth of said ratchet and actuator wheels, respectively, the toe of the pawl which drives the actuator wheel being wider than said wheel, means for holding the toothed end of said ratchet feeding pawl normally out of engagement with the teeth of said wheel, a substantially L-shaped pawl guard pivotally mounted adjacent said toothed wheels and having the long arm thereof arranged horizontally and extending into the path of the pawl having the broad toe to normally hold said pawl out of engagement with the teeth of said shaft actuator wheel, and mechanism operable by the pattern ring for moving said L-shaped guard out of the path of the feeding pawl at predetermined intervals to permit said pawl to engage the desired tooth of the actuator wheel.

2. In a knitting machine, the combination of a supporting frame, a cam shaft journaled to rotate therein, a pattern ring revolubly mounted on said frame, a ratchet feed wheel revolubly mounted on said shaft, a toothed actuator wheel fixed to said shaft adjacent the inner face of said ratchet wheel and operable to turn said shaft, a bell crank lever fulcrumed to said frame, means for rocking said lever, a stub shaft carried by the upright arm of said lever, feeding pawls pivotally mounted on said stub shaft with their toothed ends arranged in position to engage the teeth of said ratchet and actuator wheels, respectively, the toe of the pawl which drives the actuator wheel being wider than said wheel, means for holding the toothed end of said ratchet feeding pawl normally out of engagement with the teeth of said wheel, a substantially L-shaped pawl guard pivotally mounted adjacent said toothed wheel and having the long arm thereof extending into the path of the pawl having the broad toe for holding said pawl normally out of engagement with the teeth of said actuator wheel, mechanisms operable to perform the various knitting steps actuated by said cam shaft through said toothed actuator wheel, means operable by the pattern ring for moving said guard out of the path of the wide feeding pawl to permit it to engage the desired tooth of the actuator wheel, and means operable by said ratchet wheel for lifting said guard out of the path of said feeding pawl when the pattern ring is stationary.

3. In a knitting machine the combination of a supporting frame, a cam shaft journaled to rotate therein, a pattern ring mounted on said frame, means to stop and start said pattern ring a ratchet wheel revolubly mounted on said shaft, a toothed actuator wheel fixed to said shaft adjacent to the inner face of said ratchet wheel and operable to turn said shaft, a bell crank lever fulcrumed to said frame, means for rocking said bell crank lever, a stub shaft carried by the upright arm of said bell crank lever, feeding pawls pivotally mounted on said stub shaft with their toothed ends arranged in position to engage the teeth of said ratchet and actuator wheels, respectively, the toe of the pawl which drives the actuator wheel being wider than said wheel, means for holding the toothed end of said ratchet feeding pawl normally out of engagement with the teeth thereof, a substantially L-shaped pawl guard pivotally mounted adjacent said toothed wheels and having the long arm thereof extending into the path of the pawl having the broad toe to hold said pawl normally out of engagement with the teeth of said actuator wheel, mechanism operable by the pattern ring for moving said L-shaped guard out of the path of the feeding pawl to permit it to engage the desired tooth of the actuator wheel, coöperating means carried by said ratchet wheel and toothed actuator wheel for bringing said ratchet wheel into operation for actuating said actuator wheel simultaneously with the throwing out of operation of the pattern ring.

4. In a knitting machine, the combination of a supporting frame, a cam shaft journaled to rotate therein, a pattern ring mounted on said frame, a ratchet wheel revolubly mounted on said shaft, a toothed actuator wheel fixed to said shaft adjacent to the inner face of said ratchet wheel and operable to turn said cam shaft predetermined distances, a bell crank lever fulcrumed to said frame, means for rocking said bell crank lever, a stub shaft carried by the upright arm of said bell crank lever, feeding pawls pivotally mounted on said stub shaft with their toothed ends arranged in position to engage the teeth of said ratchet and actuator wheels, respectively, the toe of the pawl which drives the actuator wheel being wider than said wheel, means for holding the toothed end of said ratchet feeding pawl normally out of engagement with the teeth thereof, a substantially L-shaped pawl guard pivotally mounted adjacent said toothed wheels having the long arm thereof extending into the path of the pawl having the broad toe to hold said pawl normally out of engagement with the teeth of said actuator wheel, mechanism operable by the pattern ring for moving said L-shaped guard out of the path of the feeding pawl to permit it to engage the desired tooth of the actuator wheel, and coöperating means carried by said ratchet wheel and said L-shaped guard to act as a safety-guard for normally preventing the feeding of the ratchet wheel.

5. In a knitting machine, the combination of a supporting frame, a pattern ring mounted on said frame, a cam shaft journaled in said frame, a ratchet wheel revolubly mounted on said shaft, a cam on the outer face of said ratchet wheel, a toothed actuator wheel fixed to said shaft adjacent the inner face of said ratchet wheel, said toothed wheel being revoluble to operate the cam shaft to throw into operation the various knitting mechanisms of the machine at predetermined intervals, continuously reciprocating feeding pawls arranged to engage the teeth of said ratchet wheel and said toothed actuator wheel, means for normally holding the feeding pawl for said ratchet wheel out of engagement with the teeth thereof, a pivotally mounted member extending into the path of the feeding pawl for said toothed wheel for holding said pawl normally out of engagement with the teeth of said actuator wheel, means operable by said pattern ring for moving said member out of the path of said pawl to permit it to engage a tooth of said wheel at a predetermined time, means operable by said ratchet wheel for moving said pivoted member out of the path of the pawl when the pattern ring is stationary, and means controlled by the cam of said actuator ratchet wheel for throwing said pattern ring out of operation.

6. In a knitting machine, the combination of a revoluble cam shaft, a cam carrying pattern wheel, a toothed wheel for actuating said shaft, a positively oscillated pawl for actuating said wheel, movable means adapted to extend into the path of said pawl for controlling its engagement with the teeth of said wheel, adjustable means for engaging said movable means to hold it in desired position relative to said pawl, and a vertically movable pawl rod connected with said adjustable means, and operable by the cams on said cam carrying wheel for controlling the operation of said adjustable means.

7. In a knitting machine, the combination of a cam shaft, a cam carrying pattern wheel, a toothed wheel for controlling said cam shaft, a positively oscillated pawl for actuating said wheel, a lever mounted to extend into the path of said oscillated pawl to control its engagement with the teeth of said wheel, an upright lever pivoted to swing at right angles to said first mentioned lever in the path thereof, and adjusting means connected with said upright lever and operable by the cams on said pattern wheel.

8. In a knitting machine, the combination of a cam shaft, a toothed wheel for actuating said shaft, a positively oscillated pawl for actuating said wheel, a lever mounted to extend into the path of said oscillated pawl to control its engagement with the teeth of said wheel, and an upright lever pivoted to swing at right angles to said first mentioned lever and having a head provided with a plurality of step-like notches for engagement with said first mentioned lever to hold it in the desired position, and means for controlling the operation of said upright lever.

9. In a knitting machine, the combination of a cam shaft, a toothed wheel for actuating said shaft, a positively oscillated pawl for actuating said wheel, a lever mounted to extend into the path of said oscillated pawl to control its engagement with the teeth of said wheel, an inverted T-shaped member pivoted intermediately of the head thereof and having a stepped head at the free end of its stem operable in the path of said first mentioned lever, means pivotally connected with the free end of one arm of said T-shaped member for tilting the stem or shank thereof to cause one of its steps to engage said first mentioned lever, and means for controlling the operation of said pivotally connected means.

In testimony whereof I have hereunto set my hand in presence of two subscribing witnesses.

HARRY H. WEST.

Witnesses:
J. HOWARD SMITH,
BENJ. H. WEST.